US006937196B2

(12) United States Patent
Korva

(10) Patent No.: US 6,937,196 B2
(45) Date of Patent: Aug. 30, 2005

(54) INTERNAL MULTIBAND ANTENNA

(75) Inventor: Heikki Korva, Kempele (FI)

(73) Assignee: Filtronic LK Oy, Kempele (FI)

(*) Notice: Subject to any disclaimer, the term of this patent is extended or adjusted under 35 U.S.C. 154(b) by 70 days.

(21) Appl. No.: 10/754,039

(22) Filed: Jan. 7, 2004

(65) Prior Publication Data

US 2004/0140934 A1 Jul. 22, 2004

(30) Foreign Application Priority Data

Jan. 15, 2003 (FI) ........................................ 20030059

(51) Int. Cl.$^{7}$ ........................................ G01Q 1/24
(52) U.S. Cl. ........................ 343/702; 343/700 MS
(58) Field of Search ........................ 343/702, 700 MS, 343/770, 767, 845

(56) References Cited

U.S. PATENT DOCUMENTS 4,800,392 A 1/1989 Garay et al.
5,786,793 A * 7/1998 Maeda et al. ........ 343/700 MS
5,936,583 A 8/1999 Sekine et al.
6,396,444 B1 5/2002 Goward et al.
6,452,551 B1 9/2002 Chen
6,466,170 B2 * 10/2002 Zhou .................. 343/700 MS
6,529,168 B2 * 3/2003 Mikkola et al. ............ 343/702
6,573,869 B2 * 6/2003 Moore ........................ 343/702
6,664,931 B1 * 12/2003 Nguyen et al. ............ 343/767
2002/0053991 A1 5/2002 Lindell

FOREIGN PATENT DOCUMENTS

EP 0 923 158 A2 6/1999
EP 1 067 627 A1 1/2001
EP 1 248 316 A2 10/2002
EP 1 271 690 A2 1/2003
JP 11-127010 A1 5/1999
WO WO-00/74171 A1 12/2000

* cited by examiner

*Primary Examiner*—Shih-Chao Chen
*Assistant Examiner*—Huedung X. Cao
(74) *Attorney, Agent, or Firm*—Darby & Darby

(57) ABSTRACT

An internal multiband antenna intended to be used in small-sized radio devices and a radio device having an antenna according to the invention. The radiating element (330) of the antenna is a conductive part in the cover of the radio device or a conductive surface attached to the cover. The radiating element is fed electro-magnetically by a feed element (320) connected to the antenna port. The feed element is designed (321, 322) such that it has, together with the radiating element and ground plane (310), resonating frequencies in the areas of at least two desired operating bands. In addition, the resonating frequency of the radiating element itself is arranged to fall into an operating band. Antenna matching is provided by feed element design and short-circuiting (315). The radiating element design can be based on the desired external appearance of the device, and the locations of the operating bands and antenna matching are provided through feed element design and short-circuiting. The antenna requires a relatively minor space within the device.

18 Claims, 5 Drawing Sheets

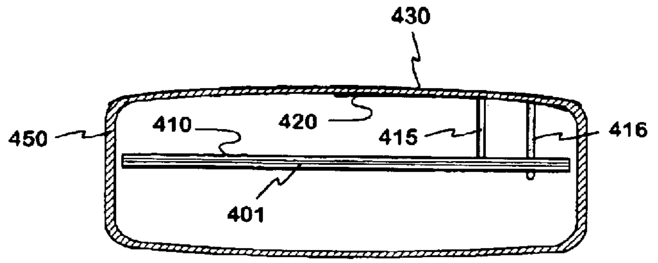
Fig. 4
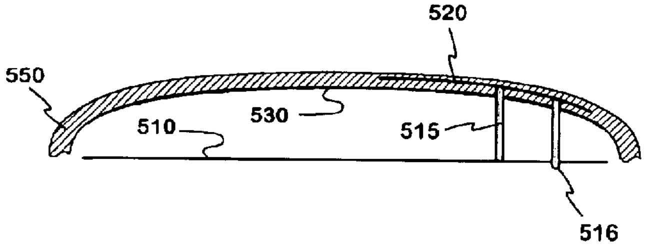
Fig. 5
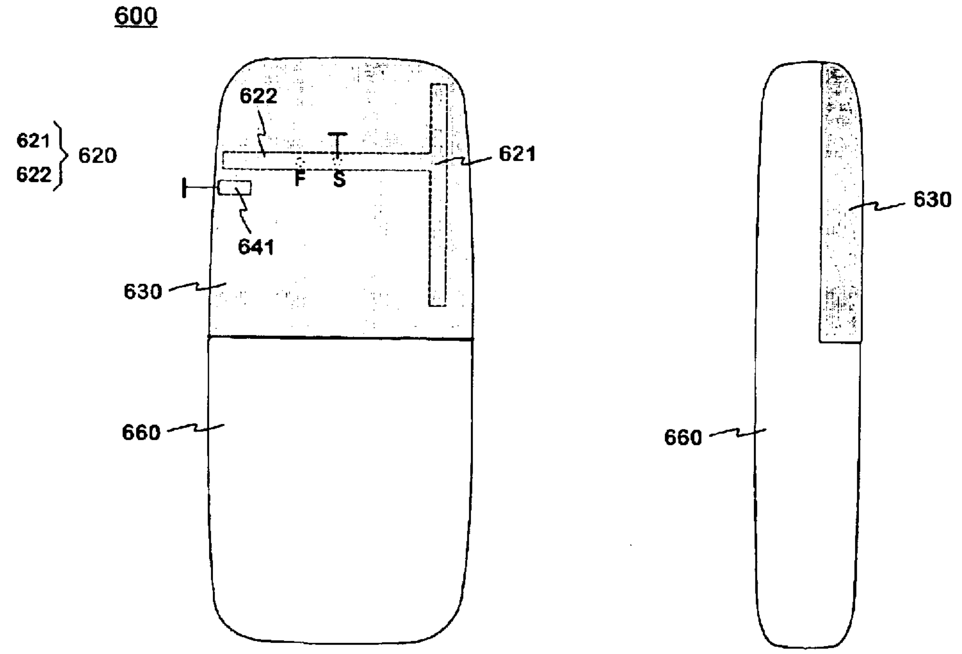
Fig. 6a
Fig. 6b

INTERNAL MULTIBAND ANTENNA

BACKGROUND OF THE INVENTION

In portable radio devices, mobile communication devices in particular, the antenna is preferably located within the covers of the device for user convenience. An internal antenna of a small-sized device is usually a planar type antenna because in that case it is easiest to achieve satisfactory electrical characteristics for the antenna. A planar antenna includes a radiating plane and a ground plane parallel thereto. To make impedance matching easier, the radiating plane and the ground plane are usually interconnected at a suitable point through a short-circuit conductor, resulting in a planar inverted F antenna (PIFA).

FIG. 1 shows a known PIFA type internal multiband antenna. Depicted in the figure there is a circuit board 101 of a radio device, which circuit board has a conductive upper surface. This conductive surface serves as a ground plane 110 in the planar antenna. At one end of the circuit board there is the radiating plane 120 of the antenna, which radiating plane lies above the ground plane, supported by a dielectric frame 150. For impedance matching of the antenna there is at the edge of the radiating plane, near a corner thereof, a short-circuit conductor 115, which connects the radiating plane to the ground plane, and the antenna feed conductor 116. For the feed conductor there is a lead-through, isolated from the ground, to an antenna port on the lower surface of the circuit board 101. The radiating plane has a slot 129 in it, beginning from the edge of the plane, near the short-circuit conductor 115, and extending to the inner region of the plane, near the opposite edge. The slot 129 divides the radiating plane into two branches 121, 122 of clearly different lengths, viewed from the short-circuit point of the radiating plane. The PIFA thus has at least two separate resonating frequencies and the corresponding operating bands.

A disadvantage of the structure shown in FIG. 1 is that when trying to achieve a very small device, the space required by the radiating plane within the device may be too big. In principle this disadvantage could be avoided if the radiating plane were fabricated as part of the cover of the device. This, however, would restrict the design of the radiating element and thus make it more difficult to achieve the electrical characteristics desired.

In the prior art, antenna structures are known which include a surface radiator fed by a primary radiator. FIG. 2 shows an example of such a structure. A surface radiator 230 is attached onto the inner surface of the cover 250 of a device. The structure further includes a printed circuit board 202 parallel to the surface radiator, and a strip-like feed conductor 216 of the antenna on that side of the circuit board which is visible in FIG. 2. On the opposite side of the circuit board 202, i.e. on the side facing the surface radiator, there is a conductive plane 210 with a slot-like non-conductive area 220. The center conductor of the feed line 205 is connected to the conductive strip 216 and the sheath to the conductive plane 210 which is thus connected to the signal ground. The antenna is matched by choosing appropriate dimensions for the circuit board 202 with its conductive parts. Moreover, dimensions of the structure are chosen such that the slot 220 resonates in the operating band and emits energy to the surface radiator 230. As the surface radiator, in turn, resonates, it emits radio-frequency energy into its surroundings.

Antennas like the one depicted in FIG. 2 are used in some mobile network base stations, for example. It is conceivable that such an antenna be applied in mobile stations as well. An advantage of such a structure would be that the antenna could be matched without needing to shape the radiator proper. However, little or no space would be saved compared to the structure shown in FIG. 1. An additional disadvantage would be that such an antenna structure would have only one operating band.

SUMMARY OF THE INVENTION

An object of the invention is to reduce said disadvantages associated with the prior art. An antenna according to the invention is characterized in that which is specified in the independent claim 1. A radio device according to the invention is characterized in that which is specified in the independent claim 18. Some preferred embodiments of the invention are specified in the other claims.

The basic idea of the invention is as follows: The radiating element of an antenna is a conductive part in the cover of the radio device or a conductive surface attached to the cover. The radiating element is fed electromagnetically by a feed element connected to the antenna port. The feed element is designed such that it has, together with the radiating element and ground plane, resonating frequencies in at least two desired operating bands. In addition, the resonating frequency of the radiating element itself is arranged to fall into an operating band. Antenna matching is provided by feed element design and short-circuiting.

An advantage of the invention is that an element, which is designed in accordance with the desired appearance of the device, can be used as a radiator in a multi-frequency antenna. Both the arrangement of the locations of the operating bands and antenna matching can be provided without shaping the radiating element for their sake. Another advantage of the invention is that the antenna needs less space inside the device than corresponding antennas according to the prior art. This is based on the fact that in practice the feed element must be very near the radiating element and that the distance of the feed element from the ground plane can be somewhat smaller than that between the radiating plane and ground plane in a corresponding PIFA. A further advantage of the invention is that when the radiating element is in/on the cover of the device, the radiating characteristics of the antenna are better compared to a radiator located more inwardly. A further advantage of the invention is that the production costs of the antenna according to the invention are relatively low.

BRIEF DESCRIPTION OF THE DRAWINGS

Below the invention is described in detail. In the description, reference will be made to the accompanying drawings where FIG. 4 shows a second example of an internal multiband antenna according to the invention, FIG. 5 shows a third example of an internal multiband antenna according to the invention, FIGS. 6*a, b* show a fourth example of an internal multiband antenna according to the invention.

DETAILED DESCRIPTION OF THE INVENTION

Figure 3A:
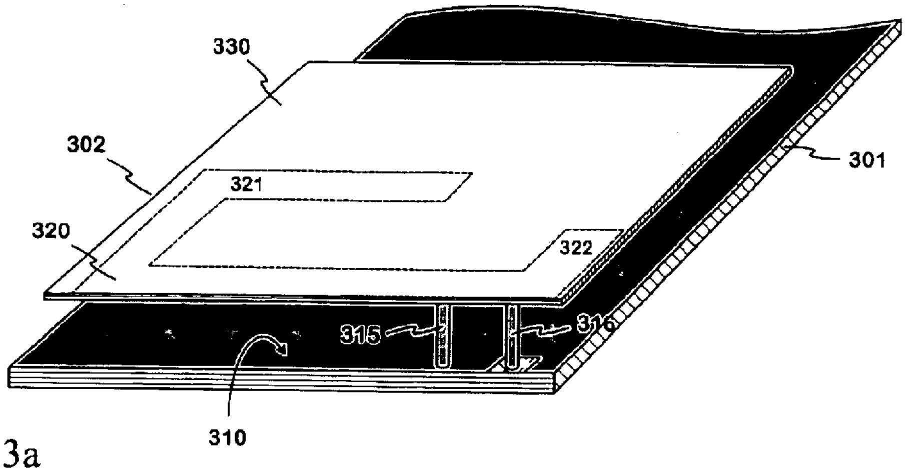
FIGS. 3*a–c* show an example of an internal multiband antenna according to the invention.
Figure 3B:
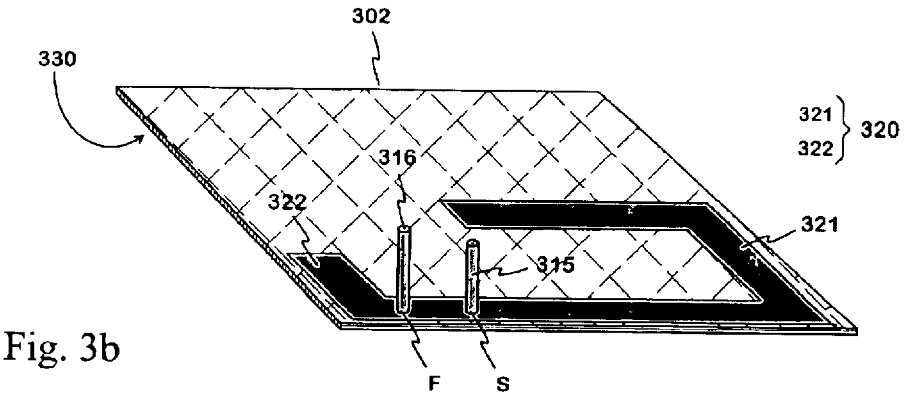
Figure 3C:
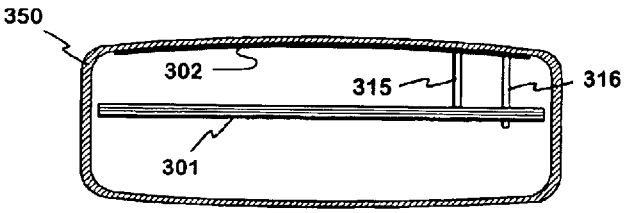

FIGS. 3*a–c* show an example of an internal multiband antenna according to the invention. In FIG. 3*a* the antenna structure is shown in perspective from the side of the radiating element. In the figure there is seen a circuit board 301 of a radio device, the conductive upper surface of the circuit board serving as a ground plane 310 for the antenna. Above the circuit board there is a parallel dielectric plate 302 the upper surface of which is coated with a conductive layer which serves as the radiating element 330 of the antenna. Let this dielectric plate be called antenna plate hereinafter. On the lower surface of the antenna plate 302, depicted in broken line in FIG. 3*a*, there is the antenna feed element 320. This is a strip conductor traveling in the vicinity of the edge of the antenna plate 302, its one end reaching the middle region of the antenna plate. There is only an electromagnetic coupling between the radiating element and feed element. The antenna plate 302 is relatively thin, say half a millimeter, whereby the electromagnetic coupling is comparatively strong. The antenna feed conductor 316 and short-circuit conductor 315 are galvanically connected to the feed element 320. The feed conductor extends, isolated from the ground, through the circuit board 301 to the antenna port on the lower surface. The short-circuit conductor connects the feed element with the ground plane, resulting in a short-circuit point in the feed element. The short-circuit point divides the feed element into two portions, the first portion 321 of which is clearly longer than the second portion 322. The antenna has two operating bands in this example. The first portion 321 of the feed element has such dimensions that together with the radiating element and ground plane it resonates in the range of the lower operating band of the antenna. The second portion 322 of the feed element in turn has such dimensions that together with the radiating element and ground plane it resonates in the range of the upper operating band of the antenna. It is also possible to excite other resonances in the antenna structure depending mainly on the size of the radiating element and its distance from the ground plane. Such a resonance can be arranged, using additional elements, to fall into the range of the upper operating band, for example, in order to make it wider. The continuous conductive surface 330 can thus be made to radiate in two separate operating bands at least one of which can be shaped by means of a third resonance. The element 330 serving as a surface radiator and receiving element can be designed in accordance with the outward appearance of the radio device in question. The locations of the operating bands and the matching of the antenna are arranged by the feed element design and short-circuiting; so, for these purposes the radiator need not necessarily be shaped. Of course the radiator can also be designed so as to help band planning and impedance matching; the radiator may for instance include a non-conductive slot which begins from the edge thereof.

FIG. 3*b* shows the antenna plate 302 with its conductors, seen from the side of the feed element 320, upside down compared to FIG. 3*a*. In the figure there is shown the feed conductor 316 of the antenna, connected to the feed element at the feed point F, and the short-circuit conductor 315, connected to the feed element at the short-circuit point S. In the figure to the right of the short-circuit point S there is the U-shaped first portion 321 of the feed element, and to the left, the L-shaped second portion 322 of the feed element. The lengths of the first and second portions do not as such correspond to the wavelengths in the operating bands, but the coupling to the relatively large radiating element makes the electrical lengths of the feed element parts longer so that these correspond to the intended wavelengths.

Figure 1:
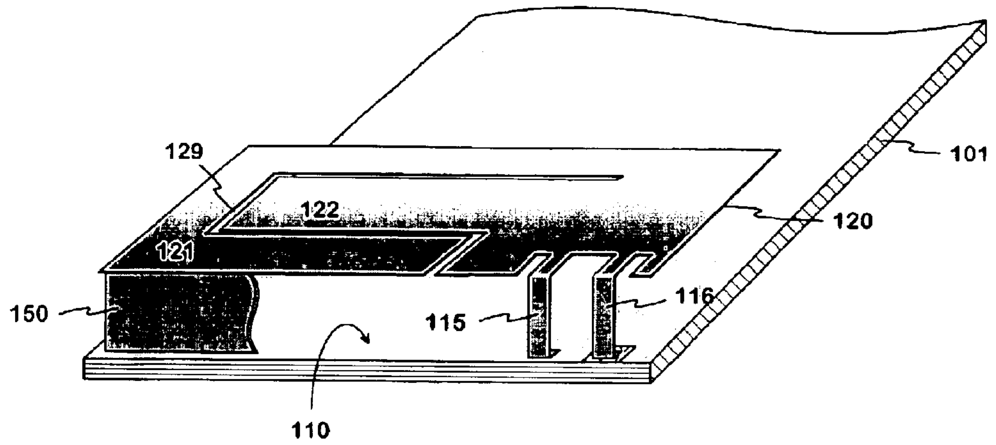
Fig. 1 PRIOR ART
FIG. 1 shows an example of an internal multiband antenna according to the prior art.
Figure 2:
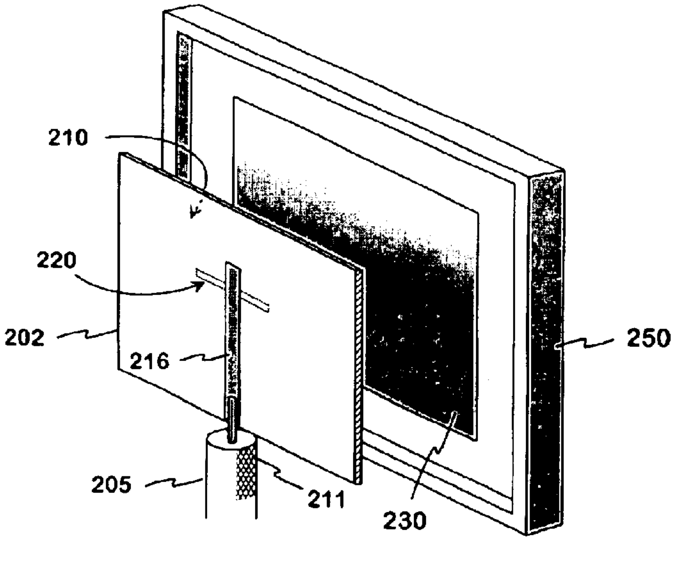
Fig.2 PRIOR ART
FIG. 2 shows a second example of an internal multiband antenna according to the prior art.

FIG. 3*c* shows a simplified cross section of a radio device having an antenna according to FIGS. 3*a, b*. There is shown the cover 350 of the radio device and the circuit board 301 of the radio device, fixed either directly or indirectly to the cover 350. An antenna plate 302 according to the invention, the width of which is nearly the same as that of the inner space of the radio device, is attached to the inner surface of the cover 350, the radiating element against the cover. In this example case, the inner surface is slightly curved so that the antenna plate 302 must bend a little. It may consist of a flexible circuit board material, and other materials may also be used without problems as the plate is so thin. The radiating element and the feed element on the lower surface of the antenna plate are not visible in FIG. 3*c*. The antenna feed conductor 315 and short-circuit conductor 316 between the circuit board 301 and antenna plate 302 are shown, however. The arrangement according to FIG. 3*c* saves space because a radiating plane like the one depicted in FIG. 1 need not be placed within the inner space of the device, separated from the cover. Furthermore, because of the relatively large radiator, the distance between the ground plane and feed element can be left somewhat smaller than that between a ground plane and radiating plane in a corresponding PIFA.

FIG. 4 shows a second example of an internal multiband antenna according to the invention. There is seen a similar simplified cross section of a radio device as in FIG. 3*c*. The difference from the structure depicted in FIG. 3*c* and in FIGS. 3*a, b* is that now the radiating element 430 is a conductive layer on the outer surface of the cover 450 of the radio device and the feed element 420 is a conductive layer on the inner surface of the cover 450. Thus the dielectric cover provides a galvanic isolation between the elements in question. The shapes of the elements may resemble those depicted in FIG. 3*a*. In the example of FIG. 4, the width of the radiating element equals to that of the whole radio device, even extending a little to the side surfaces. Such a size and the fact that there is only a very thin dielectric protective layer on top of the radiator, enhance the radiating characteristics. Moreover, it is obvious that the construction, like that depicted in FIG. 3*c*, saves space.

FIG. 5 shows a third example of an internal multiband antenna according to the invention. As in the example of FIG. 4, there is no separate antenna plate, but the radiating element and feed element are attached to the cover 550 of the radio device. The difference from FIG. 4 is that now the feed element 520 is above the radiating element 530, i.e. farther away from the ground plane 510 than the radiating element. Moreover, the feed element is now embedded within the cover 550, brought there during the fabrication of the cover. The radiating element 530 is a conductive layer on the inner surface of the cover of the radio device. It, too, could be embedded within the cover, in which case the cover would in a way resemble a multi-layer circuit board. For the short-circuit conductor 515 and feed conductor 516, holes must be made in the radiating element. Alternatively, a bend is introduced in the feed element outside the area of the radiating element and the conductors are connected to this bend.

FIGS. 6*a, b* show a fourth example of an internal multiband antenna according to the invention. FIG. 6*a* shows a radio device 600, shaped like an ordinary mobile phone, seen from behind. In this example the upper portion 630 of the rear part of the cover of the radio device is made of a conductive material and serves as a radiating element. It is made of aluminum by extruding, for example. On the inner surface of the radiating element 630 there is a thin dielectric antenna plate. This provides galvanic isolation between the radiating element and the feed element 620, depicted in broken lines in FIG. 6*a*. The feed element is in this example a T-shaped conductive strip the stem of which travels across the radiating element in the direction of the width of the radio device, and the perpendicular "beam" travels in the longitudinal direction of the radio device, near a side of the radiating element. About in the middle of the stem there are the antenna feed point F and short-circuit point S. The short-circuit point divides the feed element into two portions, as in FIG. 3*b*. In this case, the first part 621 of the feed element consists of said beam and that part of the stem which is on the beam's side. The second part 622 of the feed element consists of the rest thereof, i.e. the "base part" of the stem.

In this example, there is on the lower surface of the antenna plate, in addition to the feed element 620, a tuning element 641 which is a relatively small conductive strip near one edge of the radiating element and the second part of the feed element. The tuning element 641 is galvanically connected to the ground plane. This connection, like the ground connection of the short-circuit point S, is indicated by a graphic symbol in FIG. 6*a*. The purpose of the tuning element 641 is to set a resonating frequency of the antenna structure locating in the upper operating band of the antenna or near it and mainly depending on the radiating element and ground plane, in the upper operating band of the antenna or near it, to an advantageous point on the frequency axis. The tuning element causes a certain additional capacitance between the radiating plane and ground, and in a known manner the tuning is based on the changing of the electrical size of the element due to the additional capacitance. If necessary, more than one tuning element can be arranged.

FIG. 6*b* shows the radio device 600 of FIG. 6*a* seen from a side. The radiating element 630 is curved at its edges, forming also part of the side surfaces and end surface of the radio device. It is joined without discontinuity to the rest 660 of the cover of the radio device, said rest being made of dielectric material. The outer surface of the radiating element 630 is naturally coated with a very thin non-conductive protective layer.

Figure 7:
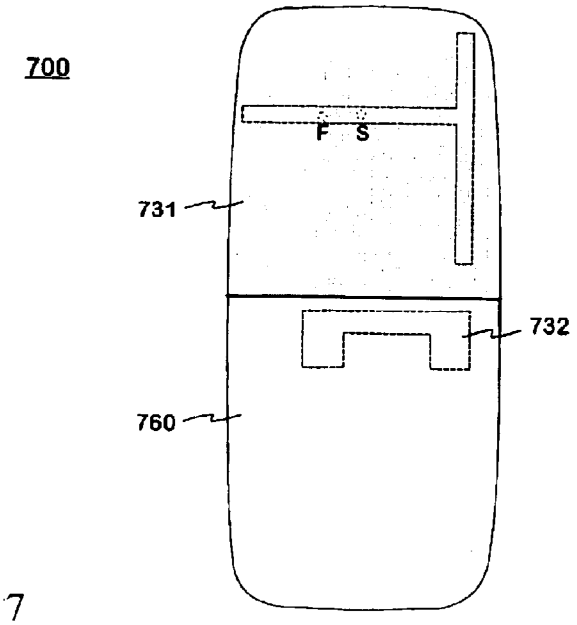
FIG. 7 shows a fifth example of an internal multiband antenna according to the invention.

FIG. 7 shows a fifth example of an internal multiband antenna according to the invention. There is seen a radio device 700 where the upper portion 731 of the rear part of the cover of the device is made of a conductive material. The element 731 is fed and serves as a radiating element just as in the examples of FIGS. 6*a, b*. In this example, there is additionally a parasitic radiator 732. It is a planar conductor beside the radiator 731 proper, on the inner surface of the non-conductive portion 760 of the cover of the radio device. The ground plane of the radio device extends under the parasitic radiator, too. The parasitic radiator may optionally be located on the same antenna plate with the main radiator, in a structure according to FIG. 4*a*. In that case, the antenna plate must of course be enlarged in accordance with the parasitic radiator. The location and dimensions of the parasitic radiator are chosen such that it resonates in the frequency range of the Bluetooth or GPS system, for example. It may also be adapted so as to resonate near some other resonating frequency of the antenna in order to widen an operating band. More than one parasitic element can be included in the antenna structure.

Figure 8:
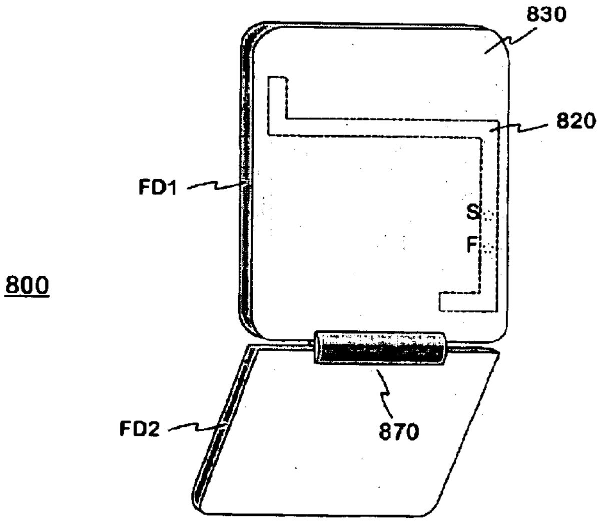
FIG. 8 shows a sixth example of an internal multiband antenna according to the invention.

FIG. 8 shows a sixth example of an internal multiband antenna according to the invention. There is seen a radio device 800 which in this case is of a foldable model. It has a first folding part FD1 and a second folding part FD2. These can be rotated with respect to one another about a hinge 870. The whole rear part 830 of the cover of the first folding part is of conductive material and serves as a radiating element. The radiator 830 is fed in accordance with the invention through a feed element 820 attached to the inner surface of the radiator in an insulated manner.

Figure 9:
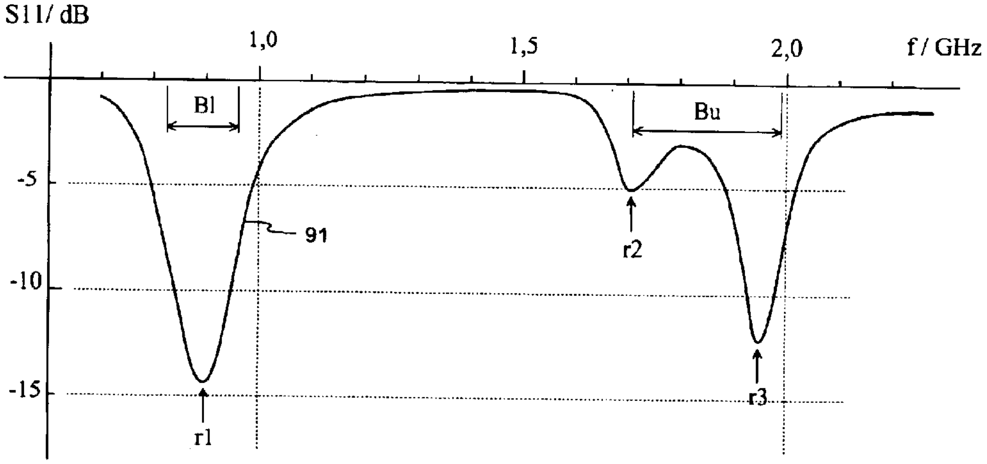
FIG. 9 shows an example of the frequency characteristics of an antenna according to the invention.

FIG. 9 shows an example of the frequency characteristics of an antenna in accordance with FIGS. 6*a, b*. Shown in the figure is a curve 91 representing the reflection coefficient S11 as a function of the frequency. The antenna measured is designed to operate in the systems GSM850 (Global System for Mobile telecommunications), GSM900, GSM1800 and GSM1900. The bands required by the former two fall into the frequency range 824–960 MHz which is the lower operating band B1 of the antenna. The bands required by the latter two fall into the frequency range 1710–1990 MHz which is the upper operating band Bu of the antenna. The curve shows that in the lower operating band the antenna reflection coefficient is below −6 dB. In the upper operating band the antenna reflection coefficient varies between −3 dB and −12 dB. The value −3 dB means barely passable matching, but the measurement was done on an antenna still under development. The shape of the curve 91 shows the antenna to have three resonances in the operating band ranges. The whole lower operating band is based on a first resonance r1 of the structure formed by the first portion of the feed element together with the radiating element and ground plane. The upper operating band is based on a second resonance r2 and third resonance r3. The frequency of the second resonance is located at the lower boundary of the upper operating band Bu and it belongs to the structure formed by the second portion of the feed element together with the radiating element and ground plane. The frequency of the third resonance is located near the upper boundary of the upper operating band and it belongs to the structure formed by the radiating element and ground plane. Tuning of the third resonance is realized using a tuning element mentioned in the description of FIG. 6*a*. The gap between the frequencies of the second and third resonances is in this example arranged to be about 240 MHz, whereby the upper operating band is very wide.

Figure 10:
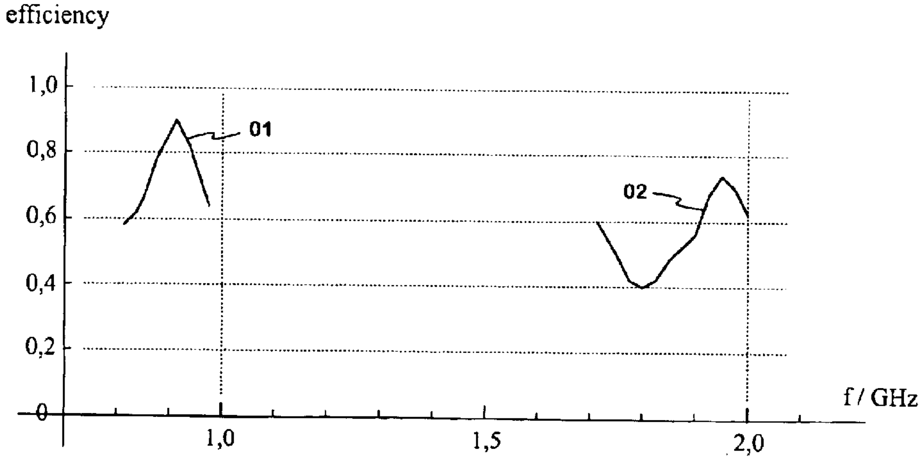
FIG. 10 shows an example of the efficiency of an antenna according to the invention.

FIG. 10 shows an example of the efficiency of an antenna according to the invention. Efficiency is measured using the same structure as for the matching curves in FIG. 9. Curve 01 shows the variation in efficiency in the lower operating band, and curve 02 in the upper operating band. In the lower operating band the efficiency varies between 0.6 and 0.9 and in the upper operating band between 0.4 and 0.75. The readings are noticeably high.

Antenna gain, or the relative field strength measured in the most advantageous direction in free space varies in the lower operating band between 1 and 3 dB, and in the upper operating band between 2.5 and 4 dB. These readings, too, are noticeably high.

The attributes "lower" and "upper" refer in this description and in the claims to the positions of the device as shown in FIGS. 3*a*, 3*c*, 4 and 5, and have nothing to do with the operating position of the devices.

Multiband antennas according to the invention were described above. The shapes and number of antenna elements may naturally differ from those presented. Moreover, the locations of the elements may vary, e.g. the radiating element may be attached to a replacement cover of a device. The invention does not limit the fabrication method of the antenna. The antenna plate may consist of circuit board material or some other dielectric material. The planar elements joined with the antenna plate or with the cover of the radio device may be of some conductive coating such as copper or conductive ink coating. They may also be of sheet metal or metal foil attached by means of ultrasound welding, upsetting, gluing or tapes. The various planar elements may have different fabrication and attachment methods. The inventional idea can be applied in different ways within the scope defined by the independent claim 1.

What is claimed is:

1. An internal multiband antenna of a radio device having at least a first and a second operating band and comprising a ground plane, radiating element, feed element, feed conductor and a short-circuit conductor, wherein the radiating element is galvanically isolated from the other conductive parts of the radio device, there is an electromagnetic coupling between the radiating element and feed element to transfer transmitting energy to the field of the radiating element and receiving energy to the field of the feed element, the feed element is connected through the short-circuit conductor to the ground plane at a short-circuit point to match the antenna, the short-circuit point divides the feed element into a first portion and second portion, and the first portion of the feed element together with the radiating element and ground plane is arranged to resonate in range of the first operating band of the antenna, and the second portion of the feed element together with the radiating element and ground plane is arranged to resonate in range of the second operating band of the antenna.

2. A multiband antenna according to claim 1, wherein the radiating element, having been installed, follows the contours of the outer surface of the radio device as regards its shape and position.

3. A multiband antenna according to claim 2, the radiating element being a rigid conductive piece belonging to a cover of the radio device.

4. A multiband antenna of a radio device according to claim 3, the radio device comprising two folding parts and said conductive piece, having been installed, constituting a rear portion of the cover of one folding part substantially entirely.

5. A multiband antenna according to claim 3, said conductive piece being an extrusion piece.

6. A multiband antenna according to claim 1, comprising a dielectric antenna plate above the ground plane with a radiating element on one surface of said plate and a feed element on opposing surface thereof.

7. A multiband antenna according to claim 6, said antenna plate being arranged to be attached to an inner surface of a non-conductive cover of the radio device.

8. A multiband antenna according to claim 7, the radiating element being positioned against said inner surface, when the antenna plate has been mounted.

9. A multiband antenna according to claim 2, the radiating element being a conductive layer on an outer surface of the cover of the radio device, and the feed element being a conductive layer on an inner surface of the cover.

10. A multiband antenna according to claim 2, at least one of the radiating element and feed element being located inside the cover of the radio device.

11. A multiband antenna according to claim 1, the feed element being located farther away from the ground plane than the radiating element.

12. A multiband antenna according to claim 1, the radiating element together with the ground plane being arranged to resonate at a third resonating frequency.

13. A multiband antenna according to claim 12, said third resonating frequency being located in a range of the second operating band of the antenna to widen that band.

14. A multiband antenna according to claim 12, further comprising at least one tuning element connected to the ground plane, which tuning element has an electromagnetic coupling with the radiating element, to set the third resonating frequency at a desired point on the frequency axis.

15. A multiband antenna according to claim 1, further comprising at least one radiating parasitic element.

16. A multiband antenna according to claim 15, said parasitic element together with the ground plane being arranged to resonate at a frequency outside the first and second operating bands to provide a third operating band.

17. A multiband antenna according to claim 15, said parasitic element together with the ground plane being arranged to resonate at the first or second operating band to widen that operating band.

18. A radio device, which includes an internal multiband antenna having at least a first and a second operating band and comprising a ground plane, radiating element, feed element, feed conductor and a short-circuit conductor, wherein the radiating element is galvanically isolated from the other conductive parts of the radio device, there is an electromagnetic coupling between the radiating element and feed element to transfer transmitting energy to the field of the radiating element and receiving energy to the field of the feed element, the feed element is connected through the short-circuit conductor to the ground plane at a short-circuit point to match the antenna, the short-circuit point divides the feed element into a first portion and second portion, and the first portion of the feed element together with the radiating element and ground plane is arranged to resonate in a range of the first operating band of the antenna, and the second portion of the feed element together with the radiating element and ground plane is arranged to resonate in a range of the second operating band of the antenna.

* * * * *